US012771637B2

(12) United States Patent
Knox

(10) Patent No.: US 12,771,637 B2
(45) Date of Patent: Oct. 20, 2026

(54) DISTRIBUTED EDGE COMPUTE ARCHITECTURE WITH MULTI-PATH OVERLAY NETWORK TRANSPORT LAYER

(71) Applicant: Akamai Technologies, Inc., Cambridge, MA (US)

(72) Inventor: Christopher R. Knox, San Diego, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 19/038,759

(22) Filed: Jan. 28, 2025

(65) Prior Publication Data

US 2026/0222340 A1 Jul. 30, 2026

(51) Int. Cl.
*H04L 45/64* (2022.01)
*H04L 45/24* (2022.01)

(52) U.S. Cl.
CPC .............. *H04L 45/64* (2013.01); *H04L 45/24* (2013.01)

(58) Field of Classification Search
None
See application file for complete search history.

(56) References Cited

U.S. PATENT DOCUMENTS

| | | | | |
|---|---|---|---|---|
| 10,277,558 | B2 | 4/2019 | Khan et al. | |
| 2011/0317703 | A1* | 12/2011 | Dunbar | H04L 61/2596 370/392 |
| 2014/0112349 | A1* | 4/2014 | Moreno | H04L 45/64 370/400 |
| 2018/0069979 | A1 | 3/2018 | Williams et al. | |
| 2023/0039665 | A1 | 2/2023 | Udupa et al. | |
| 2023/0059537 | A1 | 2/2023 | Gavand et al. | |
| 2023/0254284 | A1 | 8/2023 | McCord | |

OTHER PUBLICATIONS

International Search Report and Written Opinion, PCT/US2026/012741, mailed Jun. 29, 2026.

* cited by examiner

*Primary Examiner* — Cai Y Chen
(74) *Attorney, Agent, or Firm* — David H. Judson

(57) ABSTRACT

A Generalized Edge Compute (GEC) architecture that enables customers to deploy their applications in a Virtual Machine (VM) environment is hosted on overlay network hardware and software, thereby leveraging the advantages provided by a widely-distributed overlay. A multi-path overlay network transport layer is implemented between and among the GEC regions, and secure tunneling (e.g., using WireGuard) is then implemented to run on top of the transport layer. The multi-path overlay network transport layer is configured as a mesh network that facilitates network flows with significant path diversity, thereby ensuring reliable and efficient network connectivity for workload migration across even distributed compute locations.

18 Claims, 8 Drawing Sheets

DISTRIBUTED EDGE COMPUTE ARCHITECTURE WITH MULTI-PATH OVERLAY NETWORK TRANSPORT LAYER

BACKGROUND OF THE INVENTION

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Cloud computing is an information technology delivery model by which shared resources, software and information are provided on-demand over a network (e.g., the publicly-routed Internet) to computers and other devices. This type of delivery model has significant advantages in that it reduces information technology costs and complexities, while at the same time improving workload optimization and service delivery. In a typical use case, an application is hosted from network-based resources and is accessible through a conventional browser or mobile application. Cloud compute resources typically are deployed and supported in data centers that run one or more network applications, typically using a virtualized architecture wherein applications run inside virtual servers, or virtual machines (VMs), which are mapped onto physical servers in the data center. The virtual machines typically run on top of a hypervisor, which allocates physical resources to the virtual machines.

A virtual private cloud (VPC) is an on-demand configurable pool of shared resources allocated within a public cloud environment, providing a certain level of isolation between the different organizations (users) using the resources. Typically, isolation between one VPC user and all other users of the same cloud (other VPC users as well as other public cloud users) is achieved by allocating a private IP subnet and a virtual communication construct (such as a VLAN, a set of encrypted communication channels, or the like) per user. A virtual private network (VPN) function allocated to the VPC user provides authentication and encryption to secure the organizations' remote access to its VPC resources. The VPC is an isolated network that enables private communication between compute instances within a same data center of a cloud provider. Because cloud environments often necessitate sharing infrastructure with other users, VPCs are a critical component of many application architectures. A VPC is a common building block that exists also on other cloud providers, with additional features and isolation beyond just what one would get from, for example, a VLAN.

When a compute workload is implemented in a public cloud environment, it may be necessary or desirable to move that workload to another location, e.g., due to local resource constraints. Existing migration techniques, however, are not adequate. In particular, and unlike in a traditional CDN scenario where the CDN provider has the flexibility to map end user demand towards and away from its regions, when a customer deploys a workload in a compute region, that workload cannot be easily moved elsewhere. In this scenario, where the benefits of the CDN provider's own backbone are not available, the customer has to be provided with the network connectivity it needs. Presently, however, there are no reliable and performant solutions that would enable a compute workload or other information to be migrated or otherwise shared as cross-region traffic.

SUMMARY

A cloud compute infrastructure control plan is deployed on overlay network edge machines. This "generalized edge compute" solutions combines the computing power of the cloud compute infrastructure with the proximity and efficiency of the edge to put workloads closer to users. While traditional cloud providers support VMs and containers in a relatively small number of core data centers, the approach herein extends this capability to edge Points of Presence (PoPs), bringing full stack computing power to hundreds of previously hard to reach locations. Deploying compute into an edge platform also takes advantage of existing overlay network operational tools, processes, and observability-enabling developers to innovate across the entire continuum of compute, providing a consistent experience from centralized cloud to distributed edge.

According to this disclosure, a multi-path overlay network transport layer is also implemented between and among the GEC regions, and secure tunneling (e.g., using WireGuard) is implemented to run on top of the transport layer. The multi-path overlay network transport layer is configured as a mesh network that facilitates network flows with significant path diversity, thereby ensuring reliable and efficient network connectivity for workload migration across the distributed compute locations.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

DETAILED DESCRIPTION

Content Delivery Networks

Figure 1:
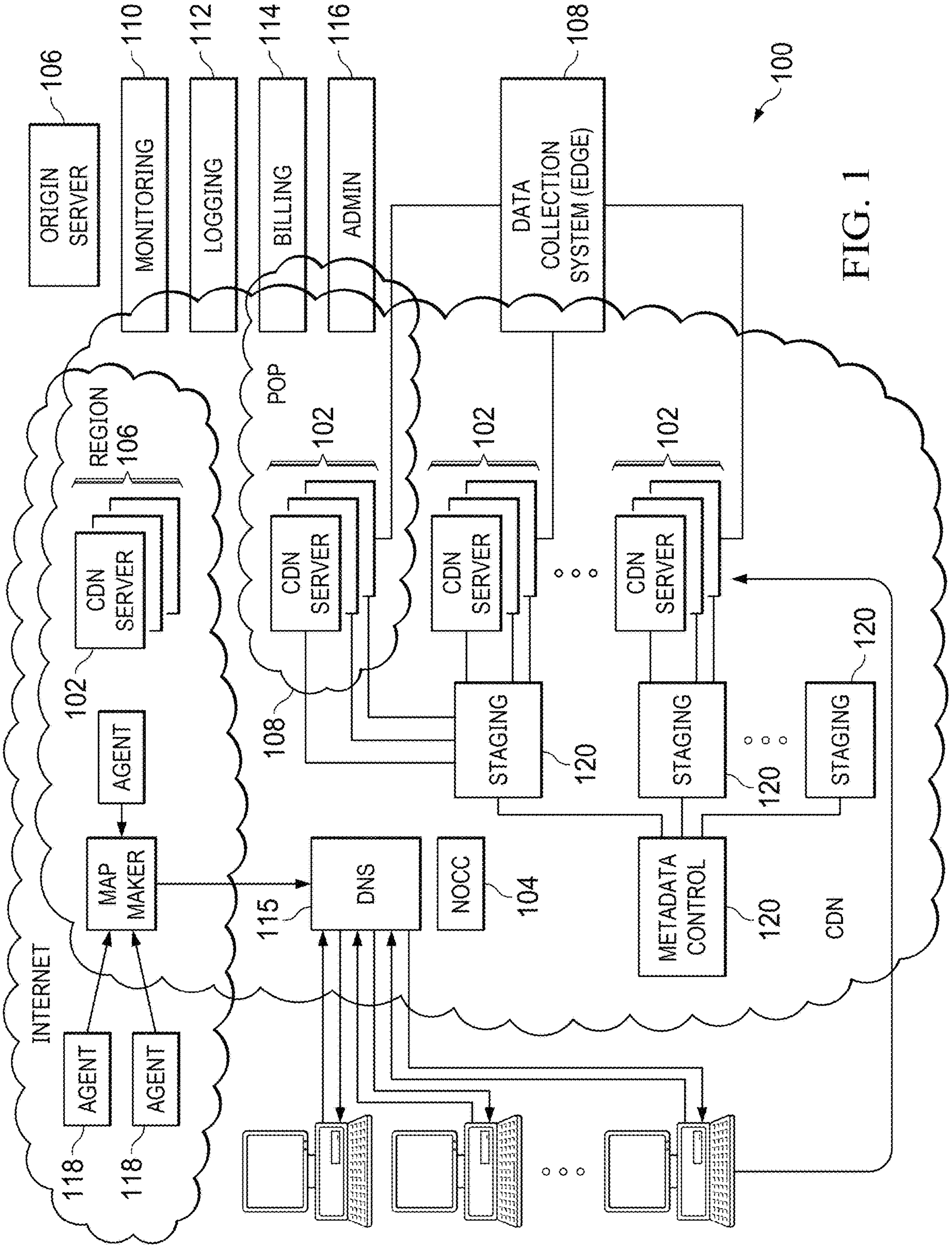
FIG. 1 depicts an overlay network configured as a content delivery network (CDN)

In a known system, such as shown in FIG. 1, a distributed computer system 100 is configured as a content delivery network (CDN) and is assumed to have a set of machines 102*a-n* distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
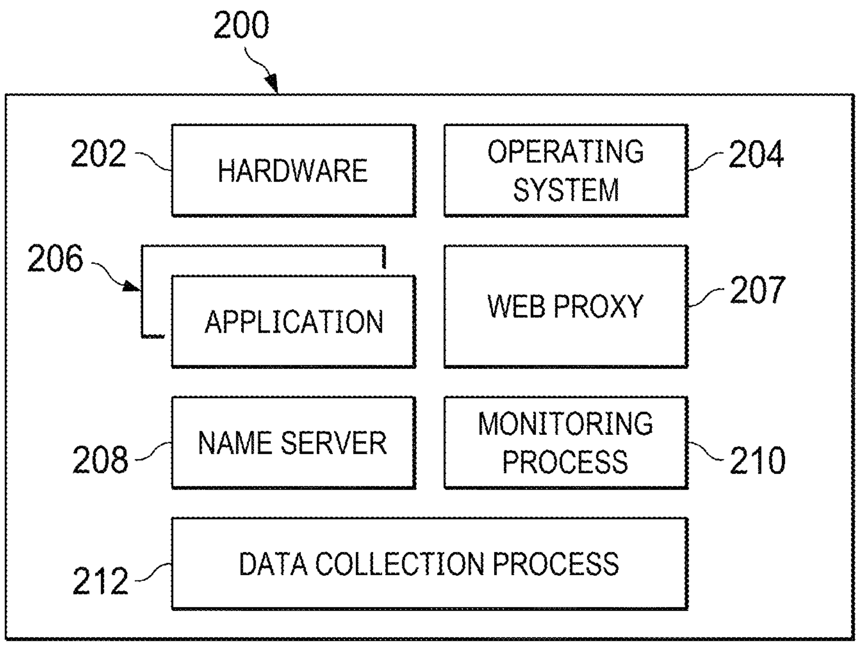
FIG. 2 depicts a representative edge machine in the overlay network.

As illustrated in FIG. 2, a given machine 200 comprises commodity hardware 202 running an operating system kernel (such as Linux or variant) 204 that supports one or more applications 206*a-n*. To facilitate content delivery services, for example, given machines typically run a set of applications, such as an HTTP proxy 207 (sometimes referred to as a "global host" process), a name server 208, a local monitoring process 210, a distributed data collection process 212, and the like.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178.

The CDN may operate a server cache hierarchy to provide intermediate caching of customer content; one such cache hierarchy subsystem is described in U.S. Pat. No. 7,376,716.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server. To enhance security, the service provider may provide additional security associated with the edge servers. This may include operating secure edge regions comprising edge servers located in locked cages that are monitored by security cameras.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

More generally, the techniques described above are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a standalone machine, or across a distributed set of machines. The functionality may be provided as a service, e.g., as a SaaS solution.

Because the CDN infrastructure (or "edge platform") is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

As used herein, an "edge server" refers to a CDN (overlay network) edge machine or server process used thereon. In the above-described context, a "region" typically is a set of edge servers or machines that are co-located with one another. More formally, a "region" or "cluster" typically is a collection of machines in a single location within a given region share equivalent front-end network connectivity and also share a local back-end network. A set of such regions and associated network infrastructure (e.g., within a metropolitan area or "metro") which shares connectivity to the Internet is sometimes referred to herein as an Equivalence-Class-Of-Region ("ECOR"). There may be multiple ECORs in any given city (although there may be cases where an ECOR spans physical nearby buildings, such as with DWDM interconnects).

The edge platform as described is a deployed network designed to manage large numbers of distributed servers in a distributed fashion. To this end, and in one non-limiting embodiment, the platform leverages an underlying Linux-based operating system (OS) (e.g., a Linux kernel version that is Ubuntu-based). A Linux kernel version of this type (sometimes referred to herein as Linux Server Install (LSI)) may have one or more supporting services such as log aggregation, data aggregation and query reporting, secret management, and the like. Using the LSI and its related services, the system provides for: deploying and managing servers at scale; role-based and standards-compliant remote access control and audit functionality; a secret management system for distributing key materials; a Network Operations Control Center (NOCC) for tooling and expertise managing systems; a platform that incorporates ways to distribute critical control information with multiple safety features built-in, and techniques for keeping server BIOS and firmware up-to-date. The LSI is readily patched and features can be added thereto as needed.

Cloud Computing

As noted, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). Typically, the cloud computing environment has a set of high level functional components that include a front end identity manager, a business support services (BSS) function component, an operational support services (OSS) function component, and the compute cloud components themselves.

A representative cloud computing infrastructure is implemented in a data center operated by a virtual machine (VM) hosting provider. A representative provider is Linode®, now owned by Akamai Technologies, Inc., of Cambridge, Massachusetts. In this infrastructure, a "Host" refers to a bare-metal machine running software. A "Compute Host" is a machine that manages virtual machines VMs and typically runs associated administrative software for a cloud compute infrastructure. A "Guest VM" is a virtual machine running on a Compute Host, and it may be a customer VM or an infrastructure VM. A "Datacenter" (CD) typically is a customer-facing abstraction for cloud compute infrastructure, typically a cluster of Guest VMs.

Figure 3:
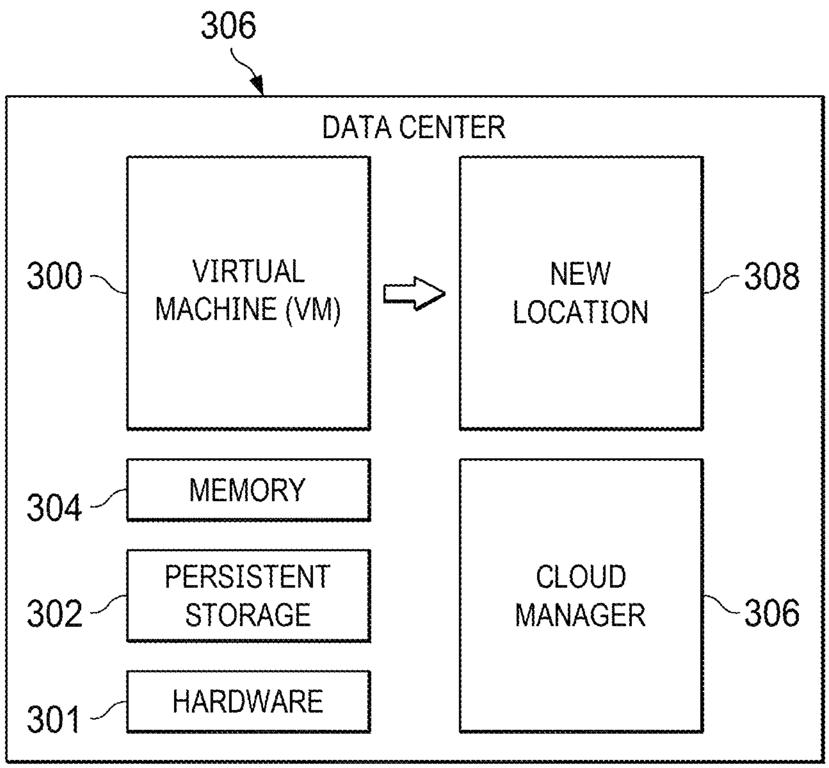
FIG. 3 depicts representative virtual machine (VM) operating environment within a data center.

A representative VM is depicted in FIG. 3. The VM 300 has associated therewith persistent storage 302, the amount of which typically varies based on size and type, and memory (RAM) 304. The local persistent storage typically is built on enterprise-grade SSDs (solid state disks). The VM's persistent storage space can be allocated to individual disks. Disks can be used to store any data, including the operating system, applications, and files. A representative VM is equipped with two (2) disks, a large primary disk used to store the OS distribution (typically Linux), software, and data, and a smaller swap disk, which is used in the event the VM runs out of memory. While two disks are typical, the VM can be configured to have many more disks, which can serve a variety of purposes including dedicated file storage or switching between entirely different Linux distributions. When multiple disks are added to a VM, configuration profiles are used to determine the disks that are accessible with the VM is powered on, as well as which of those disks serves as a primary root disk. Using tools provided by the service provider, disks can be created, resized, cloned and deleted. In addition, and by using a cloud manager 304, the VM can be migrated to another data center (if the provider operates multiple data centers), or to another location within the datacenter 306.

Figure 4:
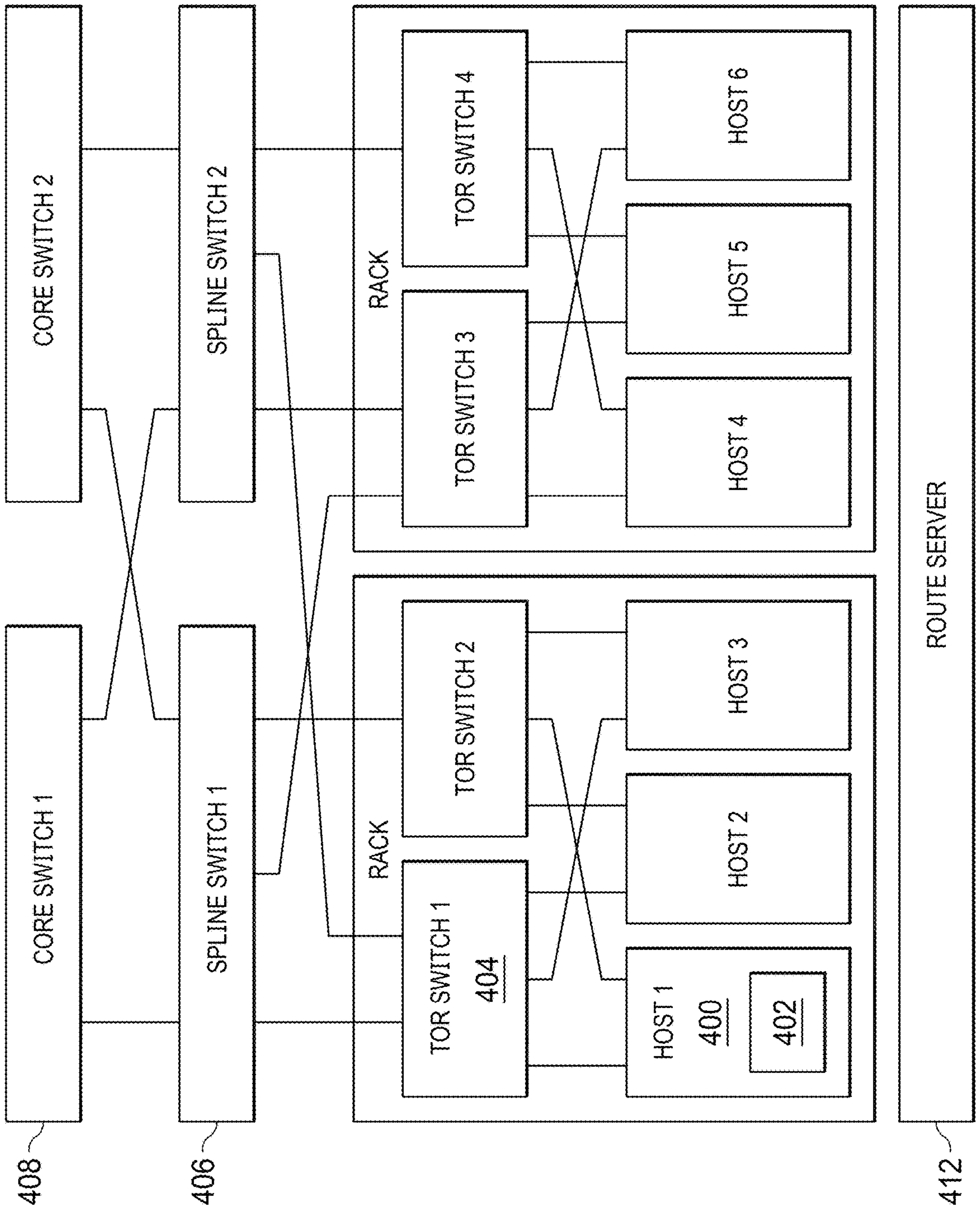
FIG. 4 depicts a representative cloud compute site.

FIG. 4 depicts a representative core site (a datacenter) that supports a known cloud compute infrastructure. As depicted, this architecture is based on a non-blocking, multistage switching network (e.g., CLOS) with Border Gateway Protocol (BGP) as the routing protocol between switches. As depicted, the Hosts 400 are physical boxes that contain the Guest VMs 402. As illustrated, each host is connected with two TOR (Top-Of-Rack) switches 404 with one physical ethernet cable to each of them. A Top-of-Rack router or switch is a network that provides connectivity between Hosts in a rack and between those Hosts and the rest of a network fabric, transit, or other such connectivity. Upstream (north) of the ToR is a set of leaf or bolt routers, in this example spine 406 and core 408 switches, which connect to the core switches 410. Routing between hosts and switches is done through BGP; all switches and hosts speak BGP with switches and hosts they have a physical connection with. In addition, typically the hosts 400 have an eBGP connection with one or more instances of a route server 412, which acts as a distributed network controller. The route server 412 may execute a route server manager process that performs leader election and starts/stops route server instances as needed. The hosts 400 use an Internet routing protocol suite (e.g., FRR or FRRouting) to establish eBGP connections to the TORs and route servers and install routes in the Linux kernel.

Figure 5:
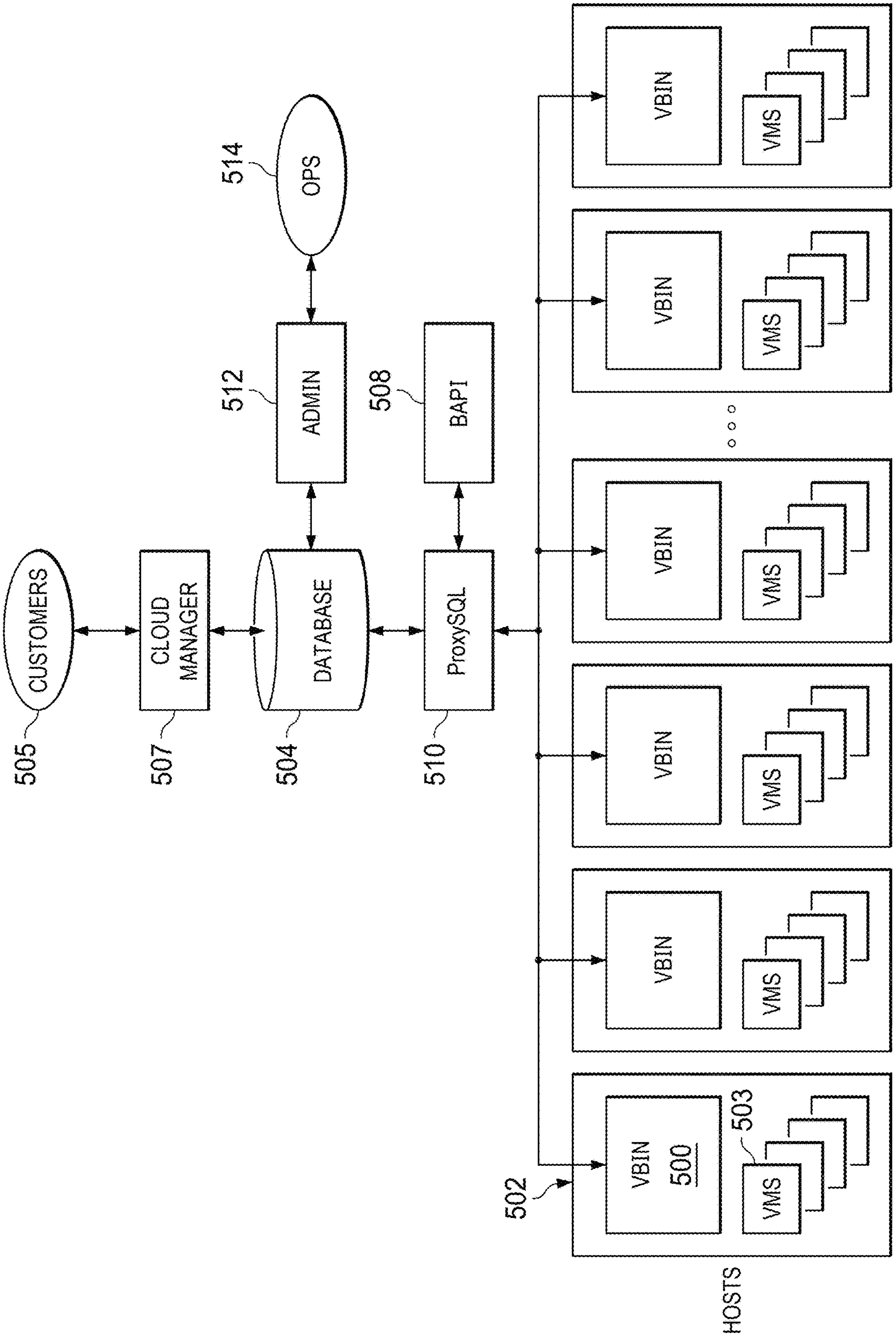
FIG. 5 depicts a control plane for managing the cloud compute site in FIG. 3.

The above-described core site is managed by a control plane that is now described and depicted with reference to FIG. 5. In a representative embodiment, a core site runs a software package that operates as a host engine 500. The host engine 500 manages virtual machines (among other things) on a host 502. The host engine 502 interoperates with a network-accessible database 504, which may be located remotely from the host. The host engine 500 executes an allocator 506 that is responsible for placing workloads onto available hardware. The job of the allocator, which may be implemented in the form of a Python function (e.g., get host), is to balance load across hardware in a customer-selected compute region, and to ensure that IP addresses, disk space, "slots", all have availability to accept the new workload. The database 504, which may be implemented as a MySQL instance, is a singleton that acts both as a data source and as a message bus. In particular, the database 504 acts as a message bus among end users interacting with the cloud compute service (typically accessed at a secure network-accessible domain), the allocator 506 making VM placement decisions, and one or more other compute infrastructure hosts performing jobs in service of end user requests. For example, when an end user creates a guest VM on the compute service, a series of jobs are inserted into the database 504 with a Host Identifier (Host ID) selected by the allocator 506. When that host wakes up from sleeping and looks for work in the database 504, it finds those jobs and starts executing on them. As a result, the compute host 502 here creates the guest VM, sets up its volumes and networks, and boots the guest VM with QEMU. QEMU is a generic and open source machine emulator and virtualizer. It emulates a computer's processor through dynamic binary translation and provides a set of different hardware and device models for the machine, enabling it to run a variety of guest operating systems. It can interoperate with Kernel-based Virtual Machine (KVM) to run virtual machines at near-native speed, and it can also emulate user-level processes, allowing applications compiled for one processor architecture to run on another. QEMU also has a migration framework that the host engine uses to move a guest VM from machine to machine. Error handling and observability are all sent back to the database 504 and reflected in a service user interface (UI) dashboard. Within this service, the datacenter acts a compute boundary. In an example implementation, a service datacenter then is a formal entity in the database 504 and is the boundary into which customers select and deploy compute. As also shown, the site may include a back-end Application Programming Interface (BAPI) 508 that is used by various components in the platform, and data collector boxes 510 that collect individual VM statistics that are used as the data source of the Analytics tab in a Cloud Manager UI exposed by the service.

In a representative embodiment, the control plane described above is managed "as-a-service" from a secure web application available, e.g., from a service provider domain or subdomain. After becoming a customer, secure permissioned access to the control plane is provided to enable the customer to provision and manage its workloads in the compute infrastructure.

Generalized Edge Compute

According to an aspect of this disclosure, virtual machine provisioning and management by the above-described control plane is configured in one or more edge sites hosted within overlay network (e.g., CDN) regions and ECORs. More formally, Generalized Edge Compute (GEC) as provided herein includes the notion of migrating compute instances such as depicted in FIG. 5 out of a core site (e.g., a datacenter) and into locations within the overlay network edge, e.g., in edge access networks including, without limitation, those networks in metropolitan areas, in emerging markets, and the like. In so doing, the techniques herein address the goal of bringing compute closer to the end user, which is a core value proposition of well-designed and implemented overlay network solutions. To this end, and in one embodiment, GEC comprises a host engine running on overlay network edge hardware and software (e.g., LSI) for the purposes of supporting generalized compute workloads. The term "generalized" in this context implies both compute that is not tied to the delivery of objects through a CDN, as well as software written in any programming language that runs within the context of a virtual machine.

The techniques described here provide significant advantages. Generalized Edge Compute transforms the cloud marketplace and takes cloud computing to the edge by embedding cloud computing capabilities into an highly-distributed overlay edge network. This solution combines the computing power of the cloud compute infrastructure with the proximity and efficiency of the edge to put workloads closer to users. While traditional cloud providers support VMs and containers in a relatively small number of core data centers, the approach herein extends this capability to edge Points of Presence (PoPs), bringing full stack computing power to hundreds of previously hard to reach locations. Deploying compute into an edge platform also takes advantage of existing operational tools, processes, and observability-enabling developers to innovate across the entire continuum of compute, providing a consistent experience from centralized cloud to distributed edge.

Provisioning the host engine onto the edge network enables a cloud compute solution that is highly distributed and that leverages the overlay network LSI-supported ancillary features and functions that include, without limitation, data aggregation, log aggregation, NOCC support, safety features (zones, rollbacks), compliance (PCI, etc.), secrets, reliable configuration distribution, and role-based, standards-compliant, auditable remote access.

Figure 6:
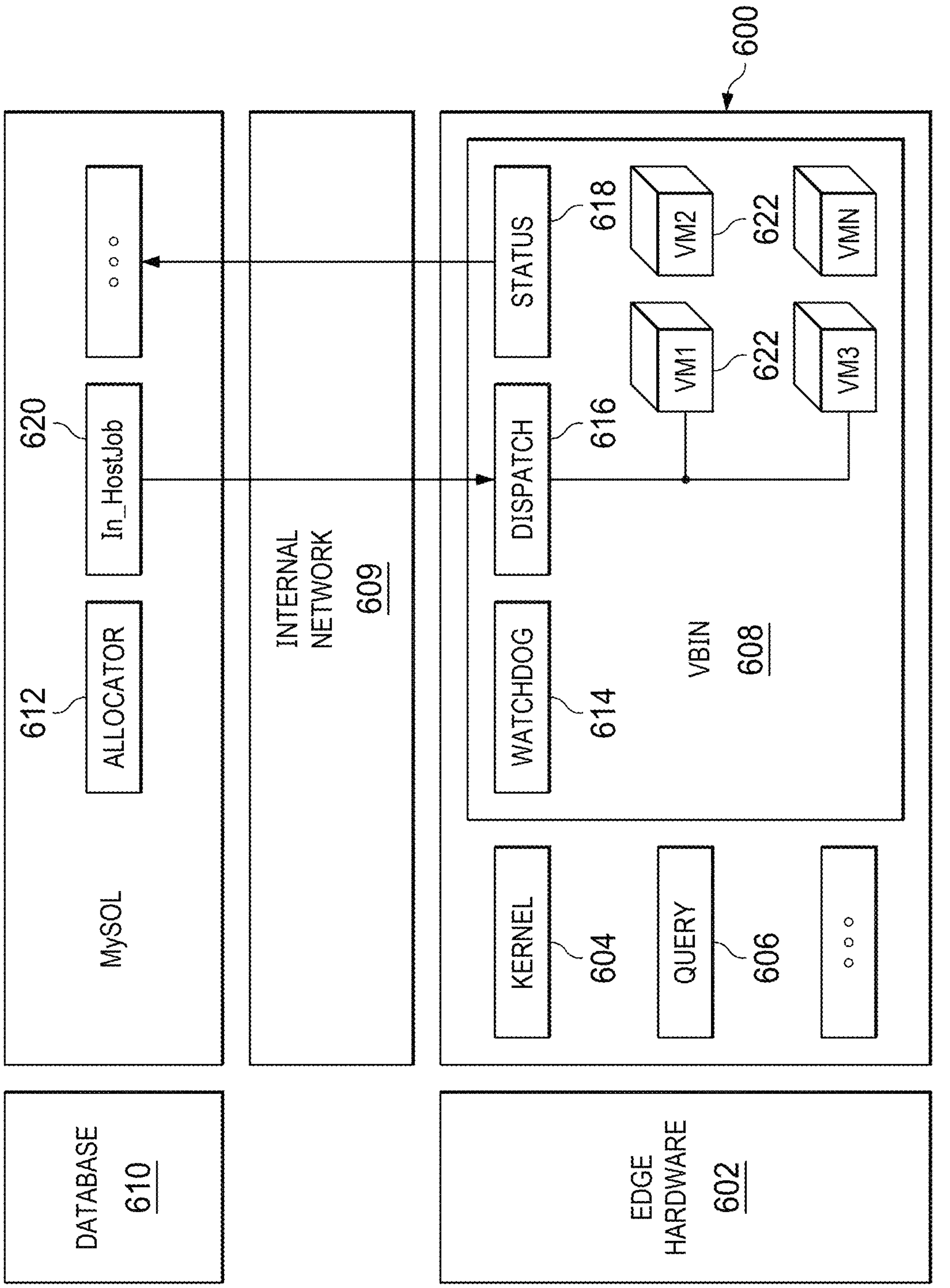
FIG. 6 depicts the Generalized Edge Compute (GEC) architecture in which the techniques of this disclosure may be practiced.

FIG. 6 depicts a representative implementation of the above-described control plane on an overlay network edge machine 600. In this example, the edge machine 600 comprises hardware 602, and the edge machine operating system (OS) 604 and supporting services 606. Here, compute host engine 608 has been delivered to the edge machine over the internal CDN network 609, and it configured to run on the OS 604 as previously described. As depicted, this host engine 608 interoperates and communicates with a remote database (DB) 610, which, together with the allocator 612, forms part of the cloud compute control plane. The database 610 holds configuration data and system state, and it is accessed directly by host engine 608. As previously noted, the database provides a message bus function between and among end users (e.g., customers) interacting with web application compute service platform, the allocator 612 making VM placement decisions, and compute hosts (in this case host engine 608 executing on top of LSI in the overlay edge machine) performing jobs in service of those end user requests. In this embodiment, the host engine 608 includes a watchdog function 614, a dispatch function 616, and a status function 618. The allocator 612 makes the VM placement decisions and runs an In_Host job to implement them on the host engines, one of which is shown. The In_Host job refers to an In_Host table, which for each host defines a set of "slot type" capacities, and this table is consulted when attempting to place workloads on hosts. Preferably, the compute infrastructure provider implements one or more plans, wherein a plan defines an amount of CPU, RAM, disk, and network ingress/egress to which a VM is entitled when a compute service is purchased. Plans can be "shared," meaning the resources are shared amongst other shared plans in an oversubscribed fashion, or "dedicated," meaning CPU and RAM resources for a VM are dedicated. Generally speaking, and in response to a customer provisioning request, the allocator 612 checks whether the slot type for a selected plan has capacity on the host. In this example, the allocator has determined that a VM is configurable on the edge machine. It then configures the one or more jobs in the database series of jobs are inserted into the database 504 with a Host Identifier (Host ID) uniquely associated with the compute host engine 608 running on the edge machine.

In this example, the watchdog function 614 is responsible for waking up the host engine and instructing it to look for new work. In response, the host engine reaches out over the internet network 609 and finds the new job. The dispatch function 616 receives the job and manages the provisioning of the virtual machines 620. The status function 618 reports back its progress. Generalizing, the compute host engine creates the new VM, sets up its associated volumes and networks, and boots the VM. e.g. using QEMU running locally.

One technique to facilitate deploying or instantiating new overlay network edge regions with compute enabled involves mapping those regions (e.g., using DNS-based mapping) with respect to an existing compute datacenter. Several options exist to map overlay network edge regions to a datacenter, namely, as a single edge machine region, as an ECOR (a set of such regions), some arbitrary set of regions, perhaps one per-ECOR in an availability zone topology, and as a larger set of regions (or perhaps all regions) as a single compute "edge" datacenter. In one non-limiting embodiment, a region comprises a single rack that shares one or more (and preferably a pair of ToRs) with typically a large number (e.g., more than 20) Hosts, and multiple regions in the same ECOR comprise a Datacenter (DC).

The above-described Generalized Edge Compute solution enables customers to deploy their applications in a VM environment hosted on overlay network hardware and software, thereby leveraging all of the advantages provided by a widely-distributed overlay. The approach enables customers (whether CDN, compute, or both) to host bandwidth-intensive applications, generate Web-like traffic, mix both traffic patterns, and to implement new traffic profiles. In addition, the solution provides a multi-tenant approach to hosting multiple customer VMs onto edge network hardware, and GEC customers can run any type of workload at any time while leveraging all the benefits of the edge network.

Figure 7:
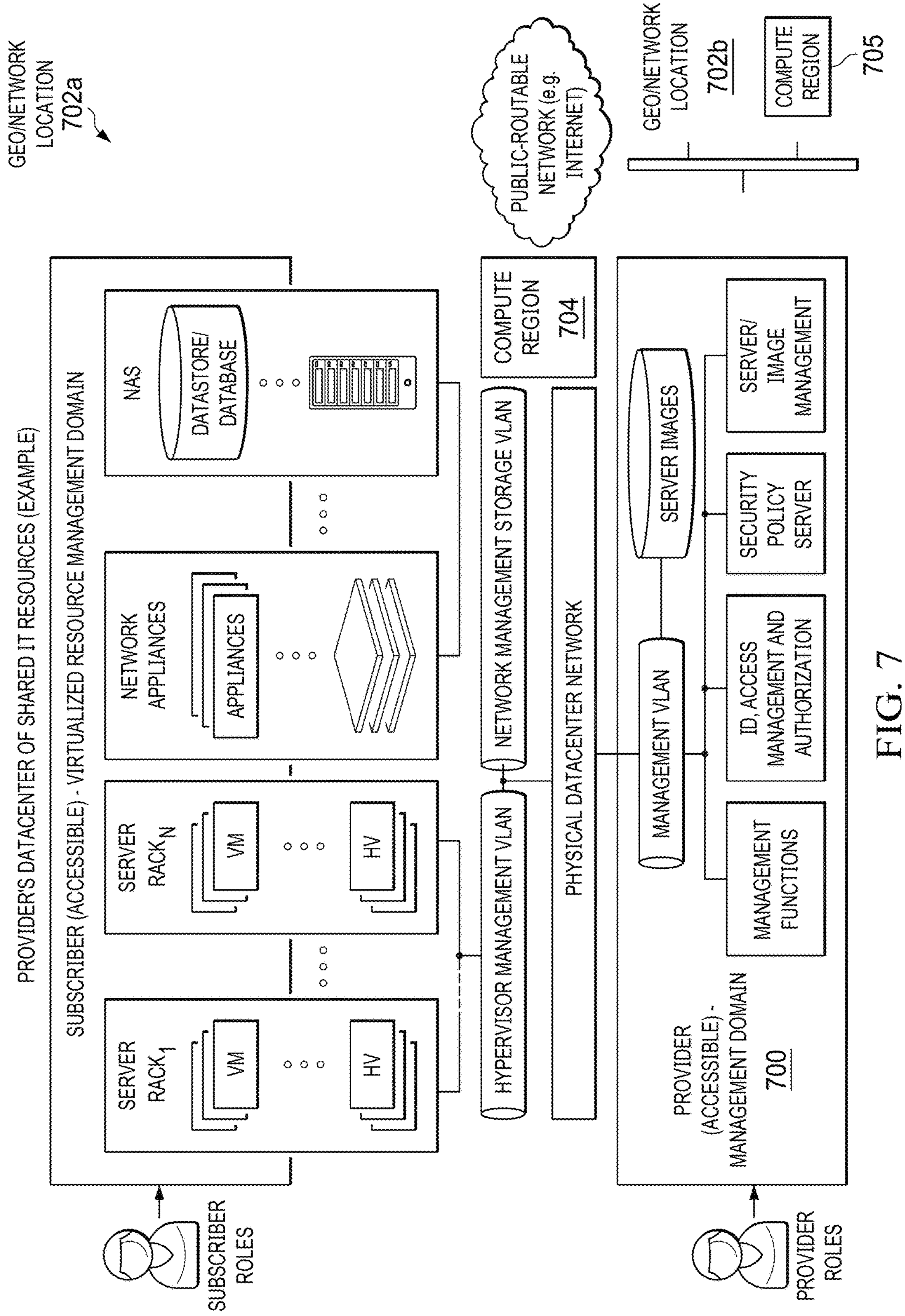
FIG. 7 depicts distributed compute locations that each support the GEC architecture.

As depicted in FIG. 7, it is desirable to deploy the GEC solution across multiple distinct regions of the overlay network. In this example, there are multiple datacenters 700 located at various geographic and network locations 702*a*, 702*b*. In this example, a first compute region 704 is located in a first CDN region at a first datacenter (e.g., LAX, in California), and a second compute region 706 is located in a second CDN region at a second datacenter (e.g., Chennai India). The compute regions are configured with the GEC solution described above. In this scenario, the CDN regions are part of an overlay network managed by the CDN provider. Unlike in a traditional CDN scenario where the CDN provider has the flexibility to map end user demand towards and away from its regions, when a customer deploys a workload in a compute region (such as region 704 or region 706), that workload (which is under the customers' control) cannot be easily moved elsewhere. In this scenario, where the benefits of the CDN provider's own backbone are not available, the customer has to be provided with the network connectivity it needs. Presently, there are no adequate solutions that would enable a compute workload to be migrated as cross-region traffic. For example, and taken the LAX-to-Chennai India (MAA) example, during a sample time period (e.g., 24 hours), the direct BGP path between these locations had unstable latency, a base roundtrip time (RTT) of approximately 300 ms, and had accumulated over five (5) minutes' worth of connectivity failures. Further, because the distributed compute locations rely on an allocator running in a given location (see, FIG. 6, allocator 612), as additional locations are implemented, it becomes increasingly difficult to keep reliable connectivity back to that location just using regular BGP routes and TCP.

One approach to this problem is to create secure tunnels between the compute regions. A known solution is the use of WireGuard, a modern VPN implementation with first-class support built into many environments, and that passes traffic over UDP. WireGuard operates at Layer 3 of the OSI stack, and it has been recently implemented as a kernel virtual network interface for Linux. The virtual tunnel interface provides for an association between a peer public key and a tunnel source IP address. The protocol uses a single round trip key exchange, and all session creation is handled transparently to the user using a timer state machine mechanism. Short pre-shared static keys are used for mutual authentication. The protocol provides strong forward secrecy and identity hiding. In a particular implementation, WireGuard uses the following: Curve25519 for key exchange, ChaCha20 for symmetric encryption, Polyl305 for message authentication codes, SipHash24 for hashtable keys, BLAKE2s for cryptographic hash function, HKDF for key derivation function, UDP-based only, and Base64-encoded private keys, public keys and preshared keys. Transport speed is accomplished using ChaCha20Poly 1305 authenticated-encryption for encapsulation in UDP. WireGuard supports both IPv4 and IPv6 and can encapsulate v4-in-v6 and vice versa.

Although secure tunneling could provide a solution to the problem of migrating performance-sensitive compute workloads across regions, solutions such as WireGuard have limitations. In particular, WireGuard connectivity is only over a single network path, and it takes place with UDP packets that have a static source and destination port (thereby placing traffic into single NIC queues). Also, and as compared to running TCP flows, it generally offers lower throughput.

Multi-Path Overlay Network Transport Layer

Figure 8:
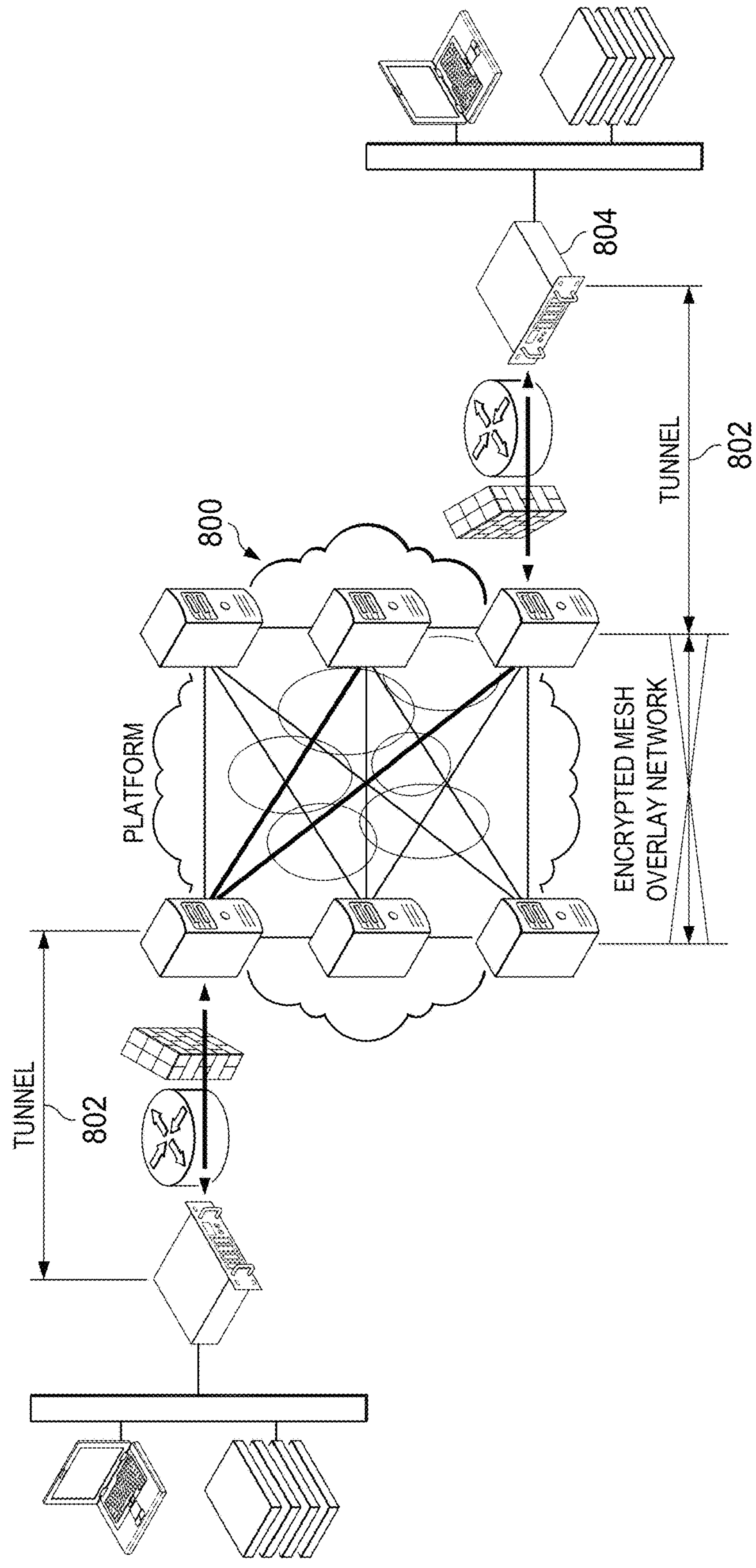
FIG. 8 depicts the multi-path overlay network transport layer of this disclosure that enables movement of a workload between the distributed compute locations of FIG. 7.

According to this disclosure, an improved compute workload management solution is provided. In this approach, and as depicted in FIG. 8, a multi-path overlay network transport layer 800 is implemented between and among the GEC regions, and secure tunneling (e.g., using WireGuard) 802 is then implemented to run on top of the transport layer 800. The multi-path overlay network transport layer 800 is configured as a mesh network that facilitates network flows with significant path diversity, thereby ensuring reliable and efficient network connectivity for workload migration across even distributed compute locations. In this solution, preferably traffic flows across the transport layer are controlled by a Software Defined Network (SDN)-based control mechanism 804. The SDN mechanism enables dynamic and programmatically efficient network configuration to create grouping and segmentation while improving network performance and monitoring. SDN centralizes network intelligence in one network component (here, the control mechanism 804) by disassociating the forwarding process of network packets (data plane) from the routing process (control plane).

Here, the SDN mechanism is configured to provide path diversity by recalculating routes periodically (e.g., every few minutes) over the transport layer, thereby shifting traffic by network prefixes. As a result, it is common for IPv4 and IPv6 network prefixes to end up taking totally separate network paths through the transport layer. As each compute instance by default has both an IPv4 and IPv6 assignment, this additional property provides additional network path diversity. In particular, and instead of only sending flows over a single IPv4 or IPv6 address, preferably both are leveraged simultaneously. Further, in a preferred implementation each packet to be delivered over a flow is hashed over a unique source (src) or source+destination (src+dest) port, which dramatically increases the network path diversity on both compute regions, as well as across many of the intermediate network hops.

In another embodiment, the SDN-based mechanism operates in association with the CDN routing mechanism, which is configured to find shorter paths, or paths without loss, when a given link is full by directly proxying traffic through one or more additional relay hops of the CDN backbone.

In a preferred embodiment, WireGuard is configured to establish the secure tunnel over each route of the multi-path overlay network transport layer. Preferably, the WireGuard tunnels are established in advance.

When it becomes necessary or desirable to move a compute workload from a first distributed compute location to a second distributed compute location, one or more of the packets comprising the workload are then duplicated and sent over multiple paths of the multi-path overlay network transport layer. Those packets are received at the second distributed compute location, where they are aggregated. The workload is then instantiated in the second distributed compute location. In this usual case, and because the WireGuard protocol provides traffic de-duplication natively, there is no additional requirement for such de-duplication to be performed by the mesh (the local GEC instance).

Figure 9:
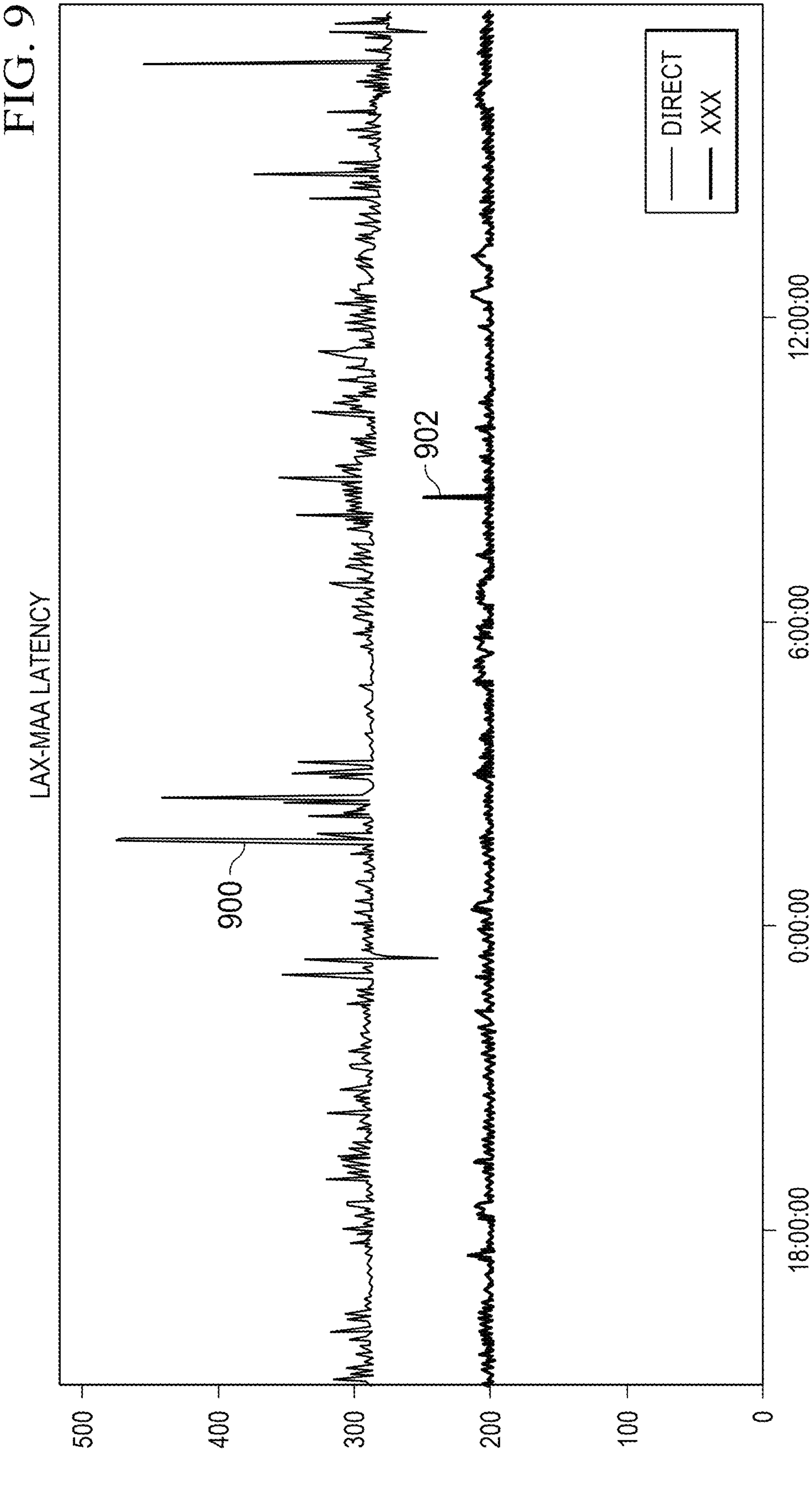
FIG. 9 depicts a graph depicting latency between the distributed compute locations using the multi-path overlay network transport layer approach of this disclosure.

FIG. 9 is a graph depicting the improved performance provided by the multi-path overlay network transport layer. The upper portion 900 represents the LAX-MAA latency as measured over a 24 hour period using default direct BGP paths, and the lower portion 902 represents the measured latency for this time period using the multi-path overlay network transport layer with supported secure tunneling according to this disclosure.

Path diversity can be further expanded to be inclusive of connectivity to end users devices that have various connectivity types, such as ethernet, Wi-Fi, and 5G. By leveraging these techniques over multiple locally attached network paths, additional use cases (e.g., such as online gaming back to the compute region to be secured) are realized. Further, because the transport layer is paired with WireGuard, the solution herein for flexibility of transporting all unicast IP packet types within the maximum MTU value.

The approach herein may also be used to facilitate region-to-region peering of a private VPC across the distributed compute locations.

The techniques herein are not limited to the compute workload migration use case. Another significant advantage of the multi-path overlay network transport layer is enabling the sharing of state information or other data between the multiple distinct regions of the overlay network supporting the GEC solution that has been described above. The state information or other data may vary. A representative example may be a multi-player gaming scenario wherein a game server located at a particular compute location has an associated database of player- or system-related state information that needs to be shared to and across multiple such compute locations. In this scenario, there is a need to be able to share that state information or other data as reliably as possible, irrespective of where (and how distributed) the compute locations are from one another. To address this scenario, and as has been described, preferably the multi-path overlay network transport layer comprising the WireGuard secure tunnels are established across the compute locations in advance. As needed, the state information or other data are then reliably shared across the multi-path overlay network transport layer in the manner previously described. In particular, preferably data packets comprising the state information or other data are delivered over routes (including over both IPv4 and IPv6 prefixes) that are recalculated periodically (e.g., every few minutes), and the above-described port hashing is also leveraged to further increase network path diversity.

Although the above description focuses on use of the WireGuard protocol, this is not a limitation. Other communication protocols and solutions may be utilized including, without limitation, OpenVPN Connect, Twingate, SoftEther VPN, UTunnel VPN, ZeroTier, Netgate PFSense, OpenVPN Access Server, and TailScale. Other VPN-based solutions may also be used.

Enabling Technologies

Each of the functions described herein may be implemented in a hardware processor, as a set of one or more computer program instructions that are executed by the processor(s) and operative to provide the described function.

The cloud compute infrastructure may be augmented in whole or in part by one or more web servers, application servers, database services, and associated databases, data structures, and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, networking technologies, etc., that together provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be computing machines running hardware processors, virtualization technologies (including QEMU), a Linux operating system, and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Generalizing, the techniques may be implemented in a computing platform, wherein one or more functions of the computing platform are implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. Typically, the cloud computing environment has a set of high level functional components that include a front end identity manager, a business support services (BSS) function component, an operational support services (OSS) function component, and the compute cloud components themselves.

According to this disclosure, the services platform described below may itself be part of the cloud compute infrastructure, or it may operate as a standalone service that executes in association with third party cloud compute services.

What is claimed is as follows.

The invention claimed is:

1. A method, comprising:

configuring an overlay network transport layer among a set of multiple distributed compute locations, wherein at least a subset of the multiple compute locations support a cloud compute control plane deployed to a network host, the network host being one of a set of distributed hosts comprising a multi-tenant shared infrastructure; and responsive to a determination that given information in a first compute location of the multiple compute locations is required to be shared to a second compute location of the multiple compute locations, instantiating a set of packet flows from the first compute location directed to the second compute location, each of the packet flows configured over a secure tunnel of the overlay network transport layer; and transferring data packets comprising the given information from the first compute location over the secure tunnels.

2. The method as described in claim 1, wherein the secure tunnel is implemented using a communication protocol.

3. The method as described in claim 2, wherein the communication protocol is WireGuard.

4. The method as described in claim 1, wherein the data packets are sent over a packet flow that is one of: an IPv4 traffic flow, an IPv6 traffic flow, and a combination of IPv4 and IPv6 traffic flow.

5. The method as described in claim 1, wherein routes over the overlay network transport layer are re-computed periodically.

6. The method as described in claim 1, wherein each packet to be delivered over a packet flow is hashed over one of: a unique source port, and a unique source and destination port.

7. The method as described in claim 1, wherein as compared to default BGP paths, the overlay network transport layer provides reduced latency for the set of packet flows.

8. The method as described in claim 1, wherein the multiple distributed compute locations are associated with regions of a Content Delivery Network (CDN).

9. The method as described in claim 1, wherein the overlay network transport layer is configured and managed with a Software-Defined Network (SDN) orchestration layer.

10. The method as described in claim 1, wherein the second compute location is geographically remote from the first compute location.

11. The method as described in claim 1, wherein the given information is a compute workload that is associated with and accessible from an endpoint application.

12. The method as described in claim 11, wherein the endpoint application is associated with multiple endpoint connections, and wherein the multiple endpoint connections are also leveraged for path diversity.

13. The method as described in claim 1, wherein the given information is state information or other data.

14. The method as described in claim 1 wherein the secure tunnels are established in advance of the determination.

15. A method, comprising:

establishing a set of secure tunnels among a set of multiple distributed compute locations, wherein at least a subset of the multiple compute locations support a cloud compute control plane, the set of secure tunnels comprising a multi-path overlay network transport layer, wherein routes across the multi-path overlay network are accessible via both IPv4 and IPv6 network prefixes; and reliably sharing information across the multiple distributed compute locations in a network path-diverse manner using IPv4 and IPv6 network routes together with port hashing.

16. The method as described in claim 15, wherein the IPv4 and IPv6 network routes are recomputed periodically.

17. The method as described in claim 15, wherein port hashing is implemented for each packet delivered over a packet flow between first and second compute locations.

18. The method as described in claim 17, wherein port hashing hashes the packet flow over a unique source or source and destination (src+dest) port associated with the first or second compute location.

* * * * *